M. HOCHSTADTER.
MEANS FOR INDICATING AND DISCONNECTING DEFECTIVE BRANCHES FROM ELECTRIC CURRENT NETWORKS.
APPLICATION FILED JULY 27, 1920.
1,432,556.
Patented Oct. 17, 1922.
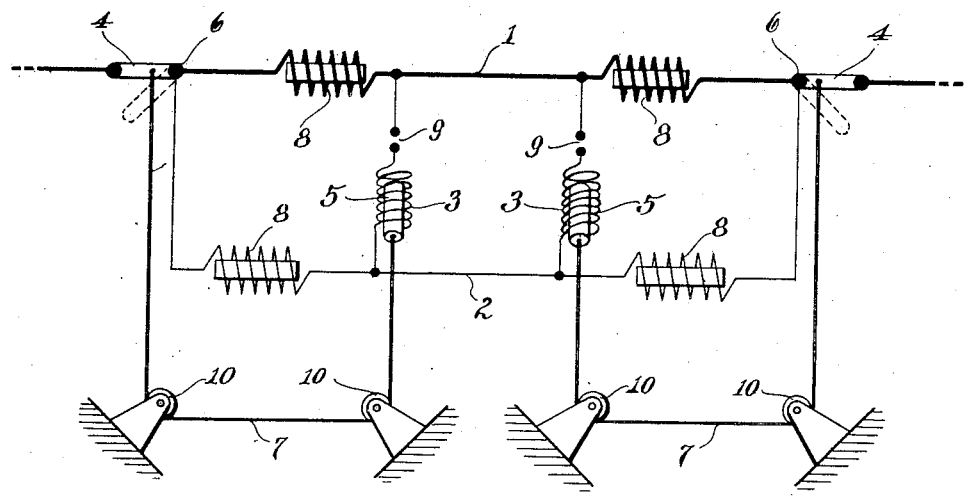
INVENTOR.
Martin Hochstädter
BY Knight Bros.
his ATTORNEYS.

Patented Oct. 17, 1922.

1,432,556

UNITED STATES PATENT OFFICE.

MARTIN HÖCHSTÄDTER, OF GRAVENHAGE, NETHERLANDS, ASSIGNOR TO N. V. LYN-PROTECTIE, OF THE HAGUE, NETHERLANDS, A DUTCH CORPORATION.

MEANS FOR INDICATING AND DISCONNECTING DEFECTIVE BRANCHES FROM ELECTRIC-CURRENT NETWORKS.

Original application filed October 20, 1914, Serial No. 867,684. Patent No. 1,404,437, dated January 24, 1922. Divided and this application filed July 27, 1920. Serial No. 399,388.

*To all whom it may concern:*

Be it known that I, MARTIN HÖCHSTÄDTER, a German citizen, residing at 157 Stationsweg, 's Gravenhage, Netherlands, have invented certain new and useful Improvements in Means for Indicating and Disconnecting Defective Branches from Electric-Current Networks, of which the following is a specification, the particular novel features of my invention being pointed out in the claims.

My invention relates to electric mains, under-ground cables or over-head transmission lines, and has for its object to increase the safety of these lines against interruptions from injuries by automatically causing the operation either of signals at the terminals of the line section within which the injured portion of the line is located or by automatically disconnecting from the network the defective portion only, in case its insulation has become defective from mechanical or electrical causes. The principal object of my invention is to bring the protecting device into action even at times when the faults leading to leakages or breakdowns are in the incipient state, especially in case of undue excess voltages arising from any cause. The ends to be accomplished by this invention are of great importance in the arrangement of the distributing lines of large central stations by which extended transmission systems are supplied, because by my improvement, faulty portions may instantaneously be eliminated before high frequency or excess voltage waves are able to spread from the point where they are generated to adjacent portions of the system and before these initial disturbances have developed into a short circuit or similar defects. In case of large power transmission systems, the cutting out of short circuits when once fully developed is very difficult and in some cases almost impossible.

According to my invention, the sudden increases in potential or the travelling waves produced thereby, which may issue from the spot where the defect develops, are used for indicating this defect or, if desired, for causing the cutting out of the section within which the fault has occurred.

The general idea of cutting out line sections at the incipient state of a fault developing in that section has been disclosed in my U. S. Patent No. 1,404,437, of January 24, 1922, entitled System for protecting electric current nets, from which this present application has been divided.

The present application deals in particular with the use of disruptive resistances or spark gaps such as were disclosed originally in Figure 5 of aforesaid application as means for indicating the faults occurring within a given section. For the purpose of the present invention, spark gaps or devices of similar character are placed so that they are operated by the disturbance travelling through that section. The idea underlying this invention is to provide the section with two conductors connected at both section ends, such as for instance a main conductor and a control conductor so that during normal operation of the system including that section, the potential in the two conductors is substantially the same throughout their whole length. The two conductors may be physically combined into one cable, insulated from each other or also may be arranged as separate conductors running parallel to each other. The only time when an appreciable potential difference between these two lines will exist is in case of a disturbance capable of giving rise to high frequency oscillations or travelling waves. These potential rises tend to equalize at the section ends, where the conductors are connected with each other, but in order to delay and hinder the progress of such waves, I provide reactance coils or similar devices near the ends of the two lines, and I provide also spark gaps between the two lines in such manner that the equalization of the potential difference between the two lines must occur through these spark gaps. In circuit with these gaps may be disposed means by which suitable apparatus well known in the art may be actuated for either indicating such a potential difference or for cutting off the line section affected by the fault.

By this arrangement of the sectionalized transmission system, the several conductors of each individual section may remain equally conductive for high frequency and travelling waves originating outside of the section but passing through it. This is necessary in order to prevent a number of consecutive line sections from being unintentionally disconnected by the same wave coming from a further distant place.

In the section in which the fault occurs, rapidly varying differences of potential are produced between the two parallel conductors, as soon as the fault commences to develop. This is due to the fact that the phenomenon of the incipient defect and its accompanying electric disturbances of high frequency will never originate from both conductors at exactly the same time and to the same degree, and only after a complete puncture of the insulation or after a complete burning out, the two conductors might be fused together at the point of the fault. According to my invention, only these incipient disturbances of the electric equilibrium between the conductors so coordinated are used to indicate the developing fault or to disconnect the section concerned, but to disconnect this section only.

In the accompanying drawings, I have illustrated the manner in which my invention may be reduced to practice without limiting, however, the invention to the exact details shown.

This drawing represents in diagrammatic form only one main conductor or phase of any kind of transmission system which may consist of a plurality of conductors adapted to supply polyphase transmission systems. Each phase of the system may be arranged and equipped such as is shown in the diagram and the safety device in each phase may operate independently of those provided in the other phases.

As an example of how the idea involved in this invention may be reduced to practice, the drawing shows a line section comprising a main conductor 1 located between the section terminals 6, 6. Between the same terminals, extends a second conductor 2, shown in the drawing as a control conductor such as is referred to in the aforesaid parent application. Thus the two conductors are connected electrically in parallel to each other between the section terminal 6, 6. In each conductor are disposed reactance coils 8 or similar devices, capable of impeding the progress of a voltage wave or similar disturbance. Furthermore, between the two conductors 1 and 2 are inserted spark gaps 9 in such manner that the reactance coils 8, 8 of the two conductors are located between the adjacent terminal 6 and the spark gap 9 located near this terminal. Of course any disruptive resistances equivalent to spark gaps known in the art may be substituted therefor. In order to cause the current passing across the spark gaps 9 in case of a disturbance, to cut off the section, any suitable device well known in the art may be utilized. The manner in which the cutting out of the section is shown in the drawings is merely diagrammatic and intended to merely be indicative of the location of such cut out apparatus. I have shown in the diagram at 3, 3 solenoid coils through which the spark gap discharge current passes from one line to the other. Within each of these coils is disposed an iron core 5 which may for instance be connected through a cord 7 which passes over rollers 10, 10, to the adjacent section switch 4, so that when current passes through solenoid 3, its core is drawn in and the section switch controlled by it is opened.

The general arrangement operates as follows. As soon as a disturbance of the character referred to hereinbefore occurs in this section between the portions at which the spark gaps 9 are located, impulses of current and voltage are produced between the main conductor 1 and control conductor 2 irrespective as to whether they occur in the main conductor or in the control conductor. These impulses are impeded and prevented from suddenly equalizing over the section ends 6 by the reactance coils 8 which offer a considerable resistance to these high frequency disturbances, while these coils owing to their proper dimensioning, do not materially interfere with the transmission of the service current of normal low frequency. Therefore, these disturbances will seek to equalize through one of the spark gaps 9 or through both and thereby cause current to flow through solenoids 3 which will actuate their respective switches as referred to hereinbefore.

The reactance coils 8 may be appropriately placed into both conductors 1 and 2, one at each section terminal, their size being adapted to the current carrying capacity of the conductors in which they are located so that disturbances which are not created within the particular section, i. e. external disturbances, pass equally through both conductors without producing a sufficient potential difference at spark gaps 9 to cause a rupture and to actuate the section switches 4. If desired, of course, the reactance coils might also be located in one of the conductors only or in each of them but only at one section end.

It may further be stated that the reactance coils 8 may as well be adapted and dimensioned, to produce also upon the normal current of the line a choking effect of sufficient value to give rise to a certain appreciable voltage drop relative to the current carried by the section. Of course, the amount of this drop must not exceed certain limits from the economical standpoint of the power transmission and in view of the fact that the condition created thereby shall not be sufficient cause of itself to produce a break at the spark gaps 9.

I claim:—

1. In an electrical distributing system, a line section comprising two conductors having their respective ends jointly connected to the respective section terminals, means for disconnecting said line section from the system at said terminals, and disruptive resistances connected between said conductors adjacent to said section terminals and being responsive to abnormal potential differences between said conductors, and an operative connection between said disruptive resistances and said disconnecting means, causing the latter to operate on response of said resistances.

2. In an electrical distributing system, a line section comprising two conductors having their respective ends jointly connected to the respective section terminals, means for disconnecting said line section from the system at said terminals, and disruptive resistances connected between said conductors adjacent to said section terminals and being responsive to abnormal potential differences between said conductors, an operative connection between said disruptive resistances and said disconnecting means, causing the latter to operate on response of said resistances, and reactance means interposed in at least one of said conductors between a section terminal and the disruptive resistance located adjacent thereto.

3. In an electrical distributing system, a line section comprising a main conductor and a control conductor having their respective ends jointly connected to the respective section terminals, means for disconnecting said line section from the system at said terminals, and disruptive resistances connected between said conductors adjacent to said section terminals and being responsive to abnormal potential differences between said conductors, and an operative connection between said disruptive resistances and said disconnecting means causing the latter to operate on response of said resistances.

4. In an electrical distributing system, a line section comprising a main conductor and a control conductor having their respective ends jointly connected to the respective section terminals, means for disconnecting said line section from the system at said terminals and disruptive resistances connected between said conductors adjacent to said section terminals and being responsive to abnormal potential differences between said conductors, an operative connection betwen said disruptive resistances and said disconnecting means causing the latter to operate on response of said resistances, and reactance means interposed in at least one of said conductors between a section terminal and the disruptive resistance located adjacent thereto.

MARTIN HÖCHSTÄDTER.